(12) United States Patent
Huckestein et al.

(10) Patent No.: US 11,169,017 B1
(45) Date of Patent: Nov. 9, 2021

(54) COMBINATION BATH MAT AND WEIGHT SCALE

(71) Applicants: William Huckestein, Ventura, CA (US); Bryan Kim, Ventura, CA (US)

(72) Inventors: William Huckestein, Ventura, CA (US); Bryan Kim, Ventura, CA (US)

(*) Notice: Subject to any disclaimer, the term of this patent is extended or adjusted under 35 U.S.C. 154(b) by 133 days.

(21) Appl. No.: 16/698,865

(22) Filed: Nov. 27, 2019

Related U.S. Application Data (60) Provisional application No. 62/782,322, filed on Dec. 19, 2018.

(51) Int. Cl.
| | |
|---|---|
| *G01G 3/14* | (2006.01) |
| *A47K 3/00* | (2006.01) |
| *G01G 19/44* | (2006.01) |
| *G01G 19/52* | (2006.01) |
| *G01G 3/142* | (2006.01) |

(52) U.S. Cl.
CPC ............ *G01G 3/142* (2013.01); *A47K 3/002* (2013.01); *G01G 19/44* (2013.01); *G01G 19/52* (2013.01)

(58) Field of Classification Search
CPC ........ G01G 3/142; G01G 19/44; G01G 21/28; G01G 19/52
See application file for complete search history.

(56) References Cited

U.S. PATENT DOCUMENTS

| | | | | |
|---|---|---|---|---|
| 4,458,771 | A * | 7/1984 | Hanssen | G01G 19/44 177/256 |
| 4,800,973 | A * | 1/1989 | Angel | G01G 3/1406 177/210 C |
| 6,583,369 | B2 * | 6/2003 | Montagnino | G01G 23/18 177/177 |
| 7,009,119 | B2 * | 3/2006 | Carlucci | G01G 19/44 177/199 |
| 2005/0151391 | A1 * | 7/2005 | Bryd | B60J 11/00 296/136.1 |
| 2007/0251006 | A1 * | 11/2007 | Kennett | A47G 9/02 5/493 |
| 2011/0049951 | A1 * | 3/2011 | Bettencourt | A47C 31/11 297/229 |

* cited by examiner

*Primary Examiner* — Randy W Gibson
(74) *Attorney, Agent, or Firm* — QuickPatents, LLC; Kevin Prince (57) ABSTRACT

A combination weight scale and bath mat for use by a person on a support surface includes a weight scale having a base with a top side, a bottom side, at least one peripheral edge, and three or more feet fixed with the bottom side of the base and adapted to hold the base above the support surface. A circuit includes a power source, a strain gauge mechanism, and an illuminated display on the top side of the base. A flexible top cover fits over the top side of the base and includes an absorbent web of material through which the illuminated display is at least partially visible. The flexible top cover further includes a foam pad with apertures cooperative with the illuminated display such that light is transmitted through the apertures from the illuminated display through the absorbent web.

14 Claims, 6 Drawing Sheets

COMBINATION BATH MAT AND WEIGHT SCALE

CROSS-REFERENCE TO RELATED APPLICATIONS

This application claims the benefit of U.S. Provisional Patent Application 62/782,322, filed on Dec. 19, 2018, and incorporated herein by reference.

STATEMENT REGARDING FEDERALLY SPONSORED RESEARCH AND DEVELOPMENT

Not Applicable.

FIELD OF THE INVENTION

This invention relates to weight scales, and more particularly to a combination anti-fatigue comfort matt and weight scale.

SUMMARY OF THE INVENTION

The present device is a combination weight scale and anti-fatigue comfort/bath mat for use by a person on a support surface, such as a bathroom floor. A weight scale has a base with a top side, a bottom side, at least one peripheral edge, and three or more feet, and typically four feet, fixed with the bottom side of the base and adapted to hold the base above the support surface.

The weight scale further includes a circuit having a power source such as a battery, a strain gauge mechanism, and an illuminated display on the top side of the base. The base has an internal volume sufficient to contain the circuit and associated components. Such a weight scale measures the weight of an object placed on the top side of the base in a manner well known in the art.

A flexible top cover is adapted for fitting over the top side and the at least one peripheral edge of the base. The top cover includes an absorbent web of material through which the illuminated display is at least partially visible. Such an absorbent web may be made with an absorbent textile material such as woven cotton, terry fabric, flannel fabric, velour fabric, muslin fabric, micro-fiber type material and other polyester-based woven fabrics, wool, and the like.

As such, with the person standing on the top cover, the circuit senses a change in the weight on the top cover and measures the weight of the person with the strain gauge mechanism. The circuit then displays the numerical weight of the person through the flexible top cover. Upon the person stepping off of the top cover the circuit detects the absence of the person due to the reduced weight and deactivates the illuminated display after a preset period of time, such as 3-5 seconds, to conserve battery life. Alternately the circuit can be designed to deactivate the illuminated display after a preset period of time, such as 7-10 seconds, even if the person has not stepped off of the weight scale.

Preferably the flexible top cover further includes a foam pad fixed below the absorbent web. The foam pad includes apertures cooperative with the illuminated display such that light is transmitted through the apertures from the illuminated display through the absorbent web. The foam pad is preferably made for a memory-foam type of material that is resilient and easy to stand on prolonged periods of time (anti-fatigue mat). The foam pad is also preferably substantially opaque so that light from the illuminated display does not diffuse through the foam pad to cause the numerical weight displayed on the illuminated display to become distorted and difficult to read.

A high-friction web is preferably fixed below the absorbent web of the top cover. The high-friction web is non-opaque and is adapted to hold the flexible top cover in place on the weight scale due to increased friction between the high-friction web and the top side of the base. The high-friction web has a peripheral edge that, with the top cover, fits over the at least one peripheral edge of the weight scale. The peripheral edge of the high-friction web may be sewn or otherwise attached with a peripheral edge of the flexible top cover to capture the foam pad therebetween and render the top cover as a single piece.

In some embodiments of the invention, the at least one peripheral edge of the base includes four peripheral edges, including a front edge, a rear edge, a left edge, and a right edge. The four edges define a rectangular area of the top side of the base. Preferably the rectangular area is sufficiently large to accommodate the person while drying after taking a bath or shower, for example, the absorbent web of the flexible top catching and absorbing water drips from the person. Such a top cover is easily removed by pulling from the weight scale and washed in a conventional clothes washing machine, or the like.

The present invention reduces floor space required in a typical bathroom by combining at least the features of a bath mat with a weight scale. Further, the present device provides for a more comfortable weighing experience by utilizing a comfortable anti-fatigue foam pad, and also provides for a more aesthetically pleasing weight scale particularly when the weight scale is turned off, which is its normal state. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
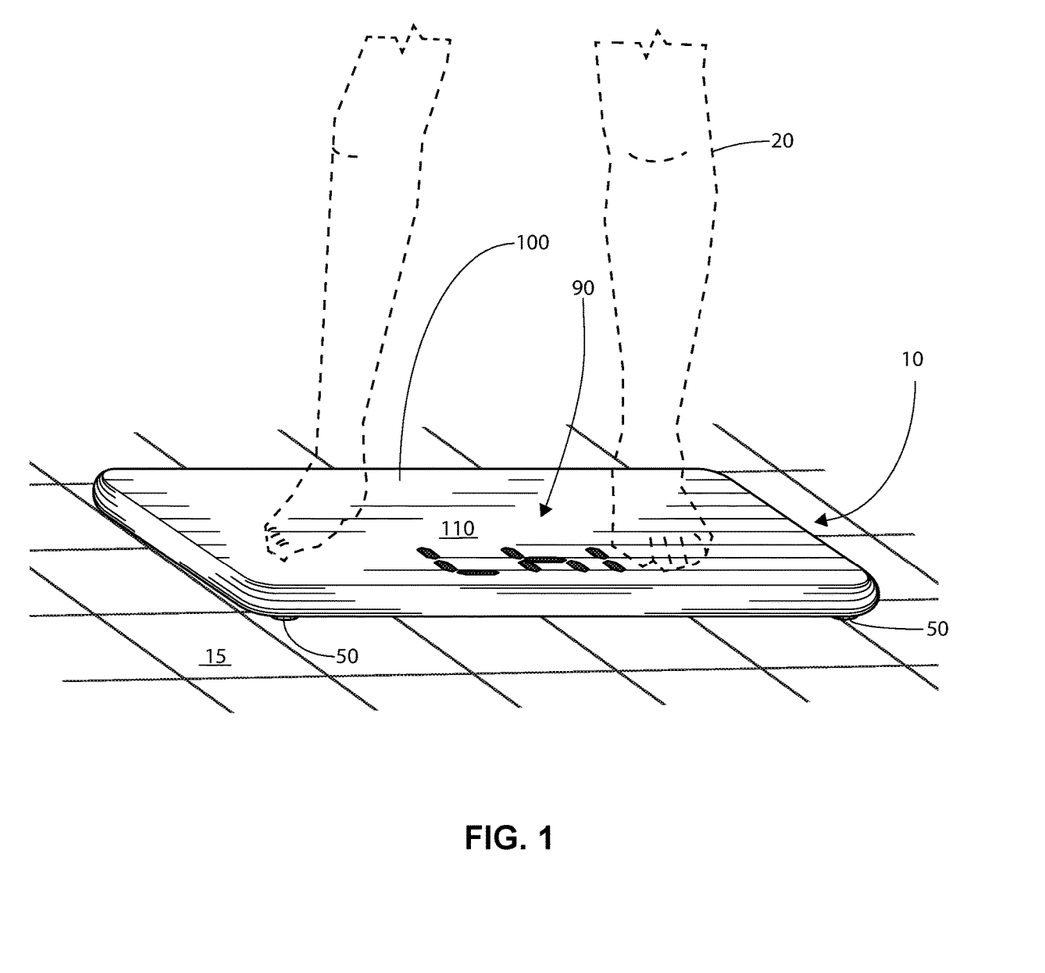
FIG. 1 is a perspective view of the invention.
Figure 2:
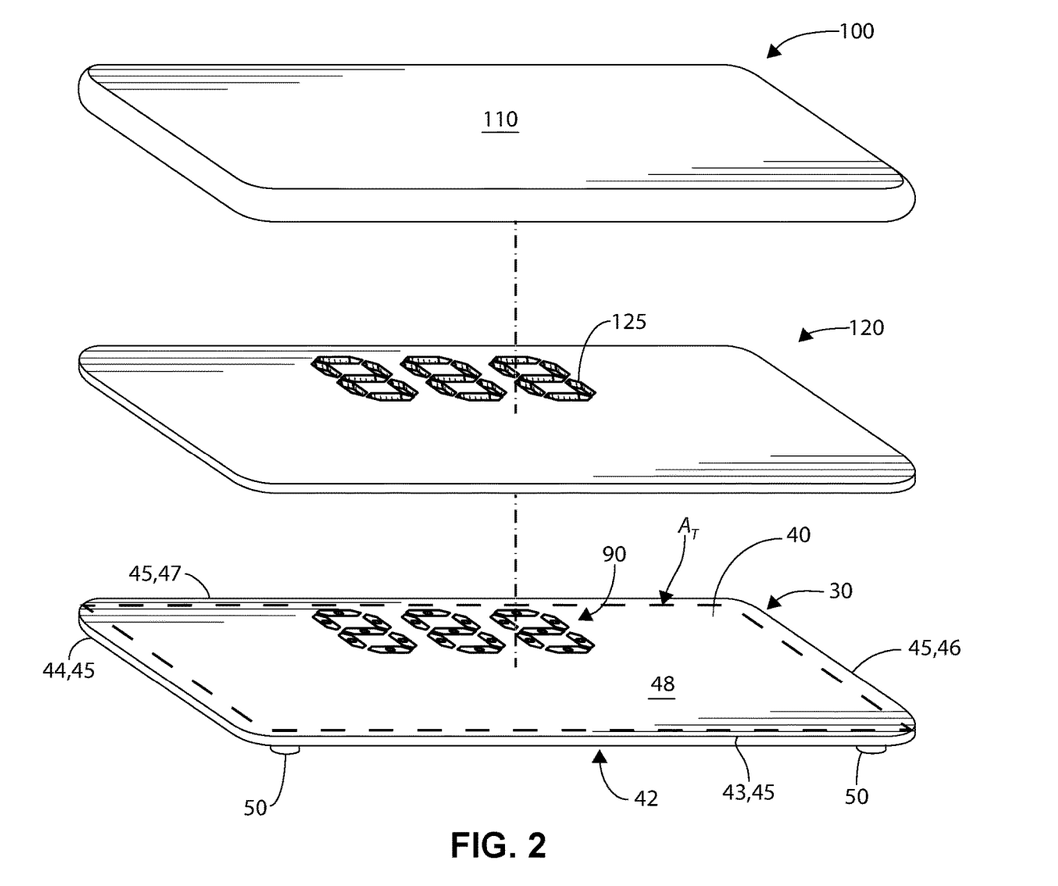
FIG. 2 is an exploded perspective view of the invention.
Figure 3:
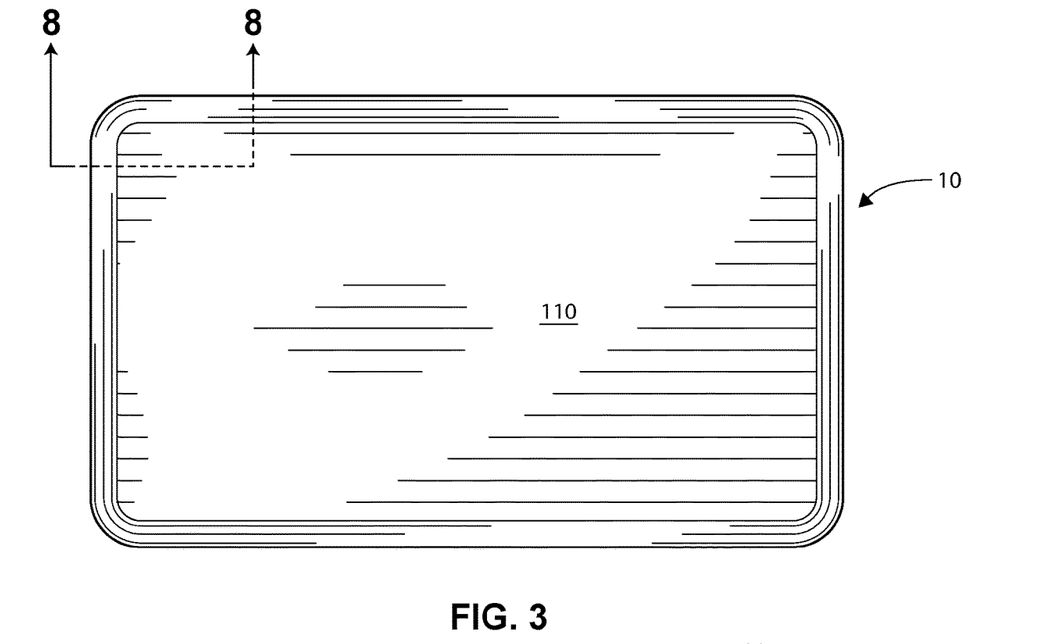
FIG. 3 is a top plan view of the invention when an illuminated display is off.
Figure 4:
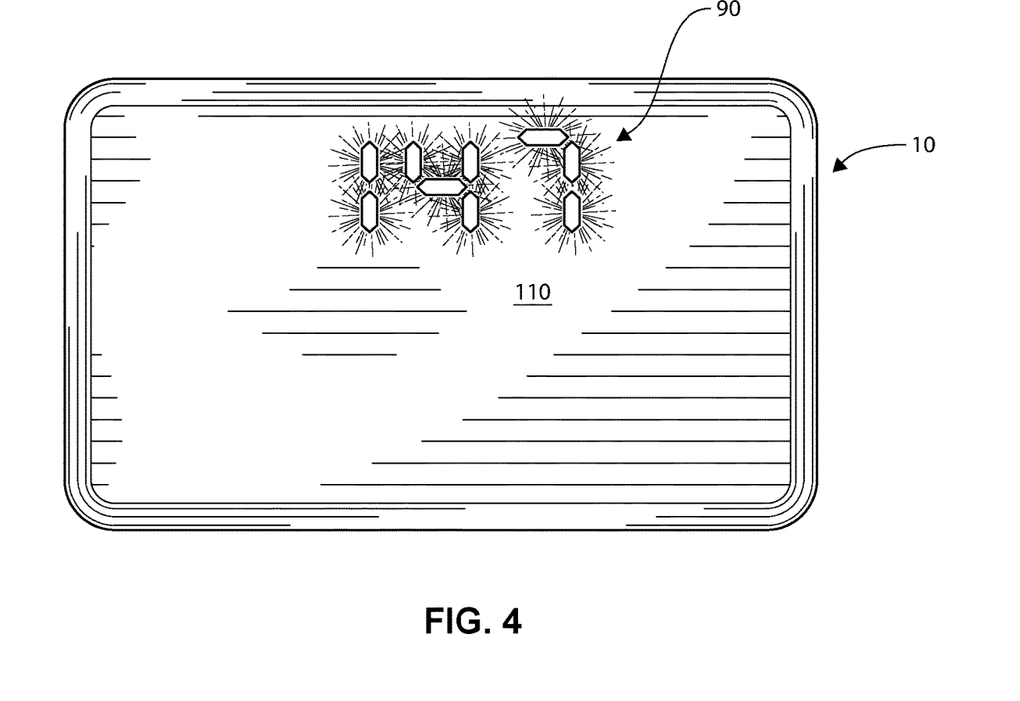
FIG. 4 is a top plan view of the invention when an illuminated display is on and shining through a top cover of the invention.
Figure 5:
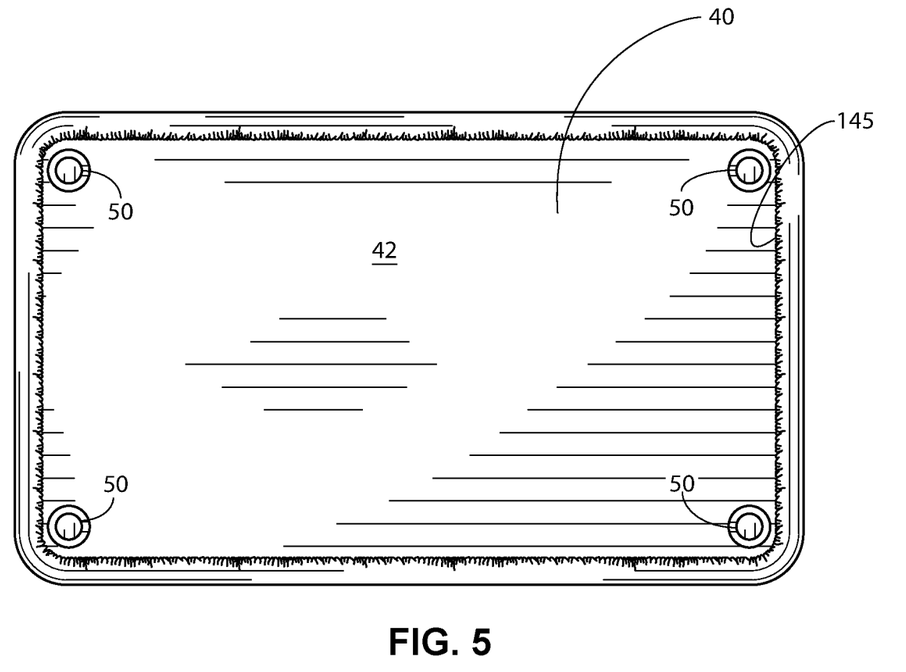
FIG. 5 is a bottom plan view of the invention.

FIGS. 1 and 2 illustrate a combination weight scale and bath mat 10 for use by a person 20 on a support surface 15, such as a bathroom floor. A weight scale 30 has a base 40 with a top side 48, a bottom side 42, at least one peripheral edge 45, and three or more feet 50 fixed with the bottom side 42 of the base 40 and adapted to hold the base 40 above the support surface 15. Preferably the weight scale 30 has four of the feet 50.

Figure 6:
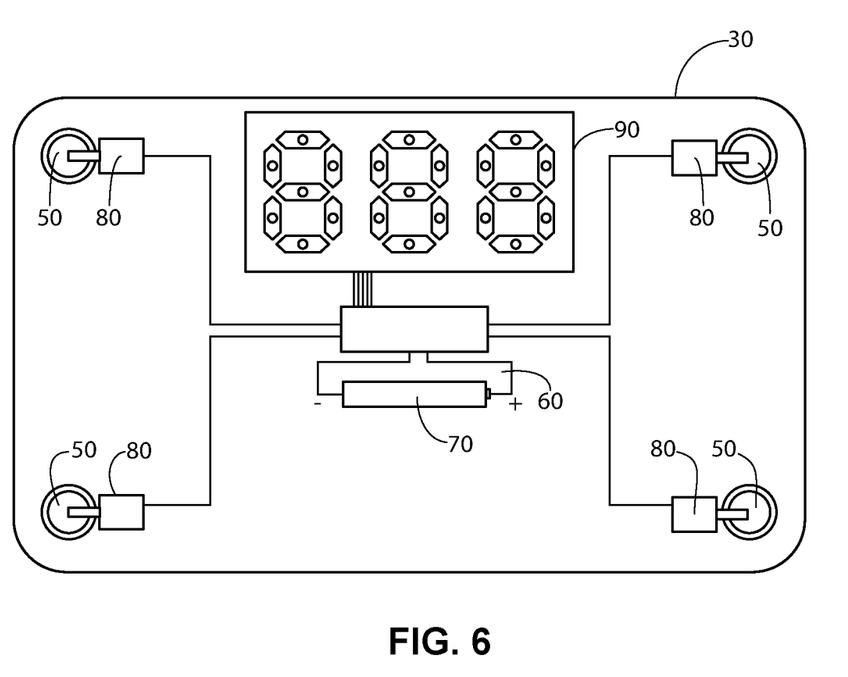
FIG. 6 is a diagram of inner components of the invention.

The weight scale 30 further includes a circuit 60 (FIG. 6) having a power source 70 such as a battery, a power cable (not shown) to an AC power source (not shown), or a bank of photovoltaic cells (not shown), or the like. The circuit 60 further includes a strain gauge mechanism 80, and an illuminated display 90 on the top side 48 of the base 40. The base 40 has an internal volume sufficient to contain the circuit 60 and associated components. Such a weight scale 30 measures the weight of an object placed on the top side 48 of the base 40 in a manner well known in the art, and many prior art weight scales 30 would suffice provided the illuminated display 90 is sufficiently large and bright enough to display a weight measurement in a manner detailed below. The illuminated display 90 is preferably an LED-driven numerical display, but could also be an alternate digital or analog display that is backlit, or the like.

A flexible top cover 100 is adapted for engaging the top side 48 of the base 40. The top cover 100 preferably includes an absorbent web 110 of material, through which the illuminated display 90 is at least partially visible. Such an absorbent web 110 may be made with an absorbent textile material such as woven cotton, terry fabric, flannel fabric, velour fabric, muslin fabric, micro-fiber type material and other polyester-based woven fabrics, wool, and the like.

As such, with the person 20 standing on the top cover 100, the circuit 60 senses a change in the weight on the top cover 100 and measures the weight of the person 20 with the strain gauge mechanism 80. The circuit 60 then displays the numerical weight of the person 20 through the flexible top cover 100, preferably either in common units of weight measure, such as kilograms, pounds or the like. Some weight scales 30 require the person to lightly tap the top surface 48 of the base 40 first to activate the weight scale 30 and to calibrate the weight at zero before stepping onto the top surface 48 with the person's entire weight. With other weight scales 30 a separate activation switch (not shown) may be depressed first before stepping onto the top surface 48. Other weight scales 30 do not need a calibration step. Upon the person 20 stepping off of the top cover 100 the circuit 60 detects the absence of the person 20 due to the reduced weight and deactivates the illuminated display 90 after a preset period of time, such as 3-5 seconds, to conserve battery life. Alternately, or additionally, as the person 20 may remain on the top cover 100 for some period of time, such as while drying off with a towel for example, the circuit 60 can be designed to deactivate the illuminated display 90 after a second preset time, such as 7-10 seconds.

Figure 8A:
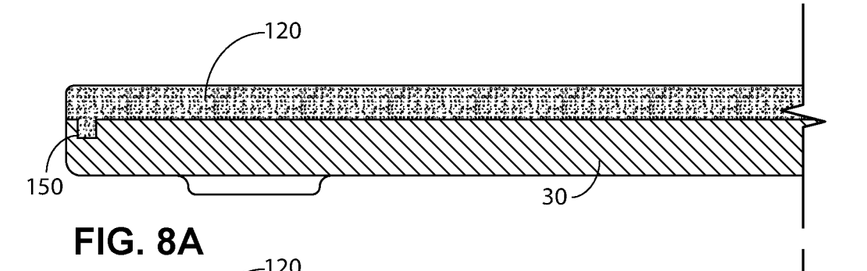
FIG. 8A is a partial cross-sectional view, taken along line 8-8 of FIG. 2, and illustrating an embodiment wherein the absorbent web of material of the top cover is omitted and the foam pad engages the weight scale at a perimeter groove thereof.
Figure 8B:
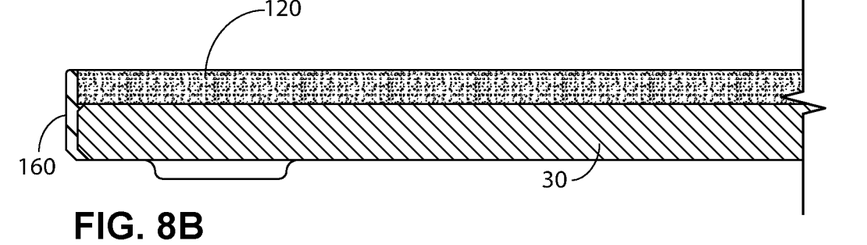
FIG. 8B is a partial cross-sectional view, taken along line 8-8 of FIG. 2, and illustrating an embodiment wherein the absorbent web of material of the top cover is omitted and the foam pad engages the weight scale at a perimeter retainer thereof.
Figure 8C:
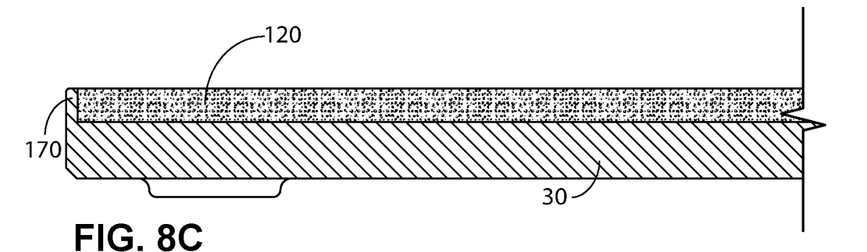
FIG. 8C is a partial cross-sectional view, taken along line 8-8 of FIG. 2, and illustrating an embodiment wherein the absorbent web of material of the top cover is omitted and the foam pad engages the weight scale at a perimeter wall thereof.
Figure 8D:
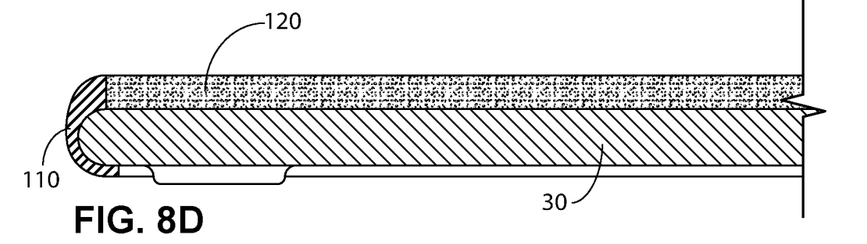
FIG. 8D is a partial cross-sectional view, taken along line 8-8 of FIG. 2, and illustrating an embodiment wherein the absorbent web of material of the top cover incorporates the foam pad.
Figure 8E:
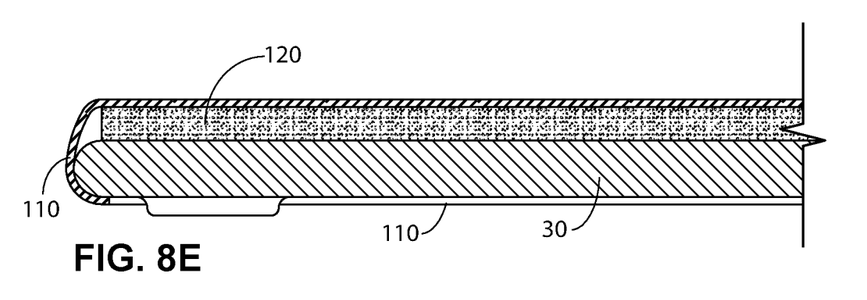
FIG. 8E is a partial cross-sectional view, taken along line 8-8 of FIG. 2, and illustrating an embodiment wherein the absorbent web of material of the top cover covers the foam pad that rests on the weight scale.

Preferably the flexible top cover 100 further includes an anti-fatigue memory-foam type foam pad 120 fixed below the absorbent web 110 (FIG. 8E). The foam pad 120 includes apertures 125 cooperative with the illuminated display 90 such that light is transmitted through the apertures 125 from the illuminated display 90 through the absorbent web 110. The foam pad 120 is preferably made for a memory-foam type of material that is resilient, and further that is substantially opaque so that light from the illuminated display 90 does not diffuse through the foam pad 120 to cause the numerical weight displayed on the illuminated display 90 to become distorted and difficult to read. Such a foam pad 120 is preferably made with anti-fatigue type mat material as is known in the art, but that is sized to fit on the weight scale 30 and allow the illuminated display 90 to be projected therethrough with one or more of the apertures 125.

Figure 7:
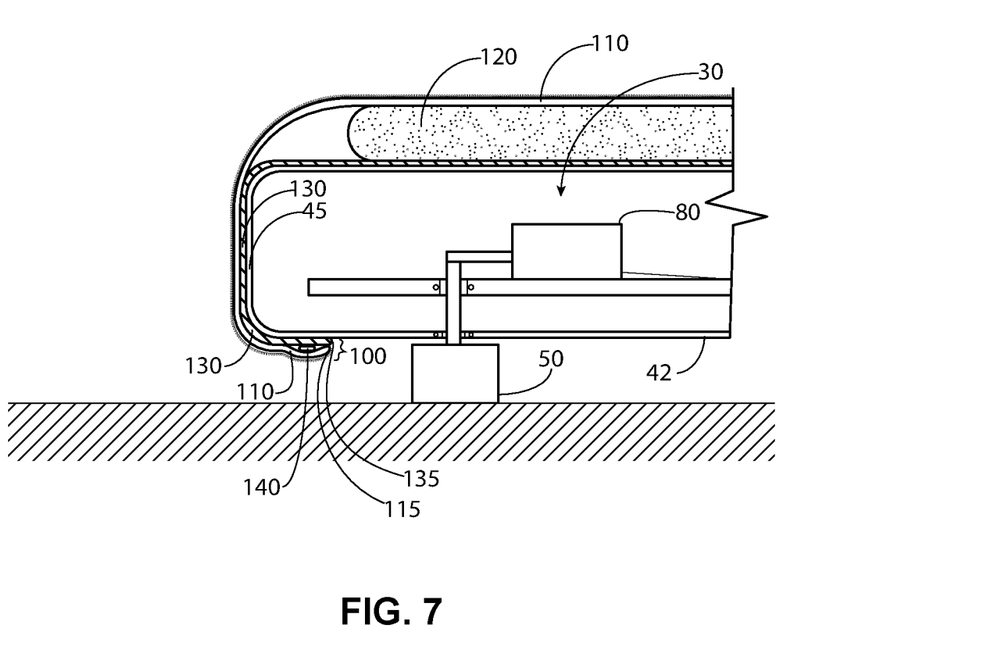
FIG. 7 is a partial cross-sectional view of one edge of the invention, showing how the top cover, a foam pad, and a high-friction web work together to fit around a weight scale of the invention.

A high-friction web 130 (FIG. 7) is preferably fixed below the absorbent web 120 of the top cover 100. The high-friction web 130 is non-opaque and is adapted to hold the flexible top cover 100 in place on the weight scale 30 due to increased friction between the high-friction web 130 and the top side 48 of the base 40. Such a high-friction web 130 may include a material known as "Con-Tact Brand" grip liners, 3M Brand "Fiction Tape," and the like. The high-friction web 130 has a peripheral edge 135 that, with the top cover 100, fits over the at least one peripheral edge 45 of the weight scale 30. The peripheral edge 135 of the high-friction web 130 may be sewn or otherwise attached with a peripheral edge 145 of the flexible top cover 100 to capture the foam pad 120 therebetween and render the top cover 100 as a single piece. In other embodiments the foam pad 120 may be separately affixed with the base 40, such as gripping the at least one peripheral edge 45 of the base 40 with a foam pad skirt (not shown), or affixing the foam pad 120 within a recessed area (not shown) of the top side 48 of the base 40, or the like.

Preferably the flexible top cover 100 includes an elastic strip 140 proximate the peripheral edge 145 of the flexible top cover 100. As such, with the flexible top cover 100 fitted over the top side 48 and the at least one peripheral edge 45 of the base 40, the elastic strip 140 pulls the peripheral edge 115 of the top cover 110 around the at least one peripheral edge 45 of the base 40 to hold the flexible top cover 100 to the weight scale 30. In one embodiment the flexible top cover 100 is comprised of the foam pad 120 abutting a perimeter of the flexible web material 110 (FIG. 8D).

In some embodiments the top cover 100 is essentially just the foam pad 120 which engages the weight scale 30 at a perimeter groove 150 (FIG. 8A) of the weight scale 30 to secure the foam pad 120 in place over the weight scale. Alternately the foam pad 120 engages the weight scale 30 at a perimeter wall 160 (FIG. 8B) of the weight scale 130 to secure the foam pad in place over the weight scale. In yet another embodiment the foam pad 120 engages the weight scale 30 at a snap-fit perimeter retainer 170 (FIG. 8C) that frictionally engages the peripheral edge 45 of the base 40 of the weight scale 30 in a friction-fit and further retains the foam pad 120 to secure the foam pad 120 in place over the weight scale 30.

In some embodiments of the invention, the at least one peripheral edge 45 of the base 40 includes four peripheral edges, including a front edge 43, a rear edge 47, a left edge 44, and a right edge 46. The four edges 43,44,46,47 define a rectangular area $A_T$ of the top side 48 of the base 40. For example, the rectangular area $A_T$ may have, for example, a front edge 43 of 16 inches or greater, and a left edge 44 of 8 inches or greater. Preferably the rectangular area $A_T$ is sufficiently large to accommodate the person 20 while drying after taking a bath or shower, for example, the absorbent web 110 of the flexible top 100 catching and absorbing water drips from the person 20. Such a top cover 100 is easily removed by pulling from the weight scale 30 and washed in a conventional clothes washing machine, or the like (not shown).

While a particular form of the invention has been illustrated and described, it will be apparent that various modifications can be made without departing from the spirit and scope of the invention. For example, the base 40 may take a round or oval shape (not shown) in plan view. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above.

The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A combination weight scale and bath mat for use by a person on a support surface, comprising:
    a weight scale having a base with a top side, a bottom side, at least one peripheral edge, and three or more feet fixed with the bottom side and adapted to hold the base above the support surface, the weight scale further including a circuit having a power source, a strain gauge mechanism, and an illuminated display on the top side of the base;
    a flexible top cover adapted for engaging the top side of the base, the flexible top cover including:
        an absorbent web of material through which the illuminated display is at least partially visible; and
        a foam pad fixed below the absorbent web, the foam pad including a plurality of apertures cooperative with the illuminated display and sized and shaped to correspond to illuminatable portions of the illuminated display, such that light is transmitted through the plurality of apertures from the illuminated display through the absorbent web, the foam pad being substantially opaque;
    whereby the person standing on the top cover activates the circuit in the weight scale, the strain gauge mechanism adapted to measure the weight of the person and the circuit displaying the numerical weight of the person through the flexible top cover, and upon stepping off of the top cover the circuit detecting the absence of the person and deactivating the illuminated display after a preset time.

2. The combination weight scale and bath mat of claim 1 wherein the flexible top cover further includes a high-friction web fixed below the absorbent web, the high-friction web being non-opaque and adapted to hold the flexible top cover in place on the weight scale.

3. The combination weight scale and bath mat of claim 1 wherein the flexible top cover includes an elastic strip proximate a peripheral edge thereof, whereby with the flexible top cover fitted over the top surface and the at least one peripheral edge of the base, the elastic strip pulls the peripheral edge of the top cover around the at least one peripheral edge of the base to hold the flexible top cover to the weight scale.

4. The combination weight scale and bath mat of claim 1 wherein the at least one peripheral edge includes four peripheral edges, including a front edge, a rear edge, a left edge, and a right edge, the four edges defining a rectangular area of the top surface of the base.

5. The combination weight scale and bath mat of claim 4 wherein the rectangular area of the top surface is greater than 16 inches by 8 inches.

6. The combination weight scale and bath mat of claim 1 wherein the numerical weight of the person displayed on the illuminated display is displayed in pounds.

7. The combination weight scale and bath mat of claim 1 wherein the numerical weight of the person displayed on the illuminated display is displayed in kilograms.

8. The combination weight scale and bath mat of claim 3 wherein the flexible top cover further includes:
   a foam pad fixed below the absorbent web, the foam pad including apertures cooperative with the illuminated display such that light is transmitted through the aperture from the illuminated display through the absorbent web, the foam pad being substantially opaque; and
   a high-friction web fixed below the absorbent web and foam pad, the high-friction web being non-opaque and adapted to hold the flexible top cover in place on the weight scale.

9. The combination weight scale and bath mat of claim 1 wherein the flexible top cover includes a foam pad that has apertures cooperative with the illuminated display such that light is transmitted through the aperture from the illuminated display, the foam pad being substantially opaque, the foam pad engaging the weight scale at a perimeter groove of the weight scale to secure the foam pad in place over the weight scale.

10. The combination weight scale and bath mat of claim 1 wherein the flexible top cover includes a foam pad that has apertures cooperative with the illuminated display such that light is transmitted through the aperture from the illuminated display, the foam pad being substantially opaque, the foam pad engaging the weight scale at a perimeter wall of the weight scale to secure the foam pad in place over the weight scale.

11. The combination weight scale and bath mat of claim 1 wherein the flexible top cover includes a foam pad that has apertures cooperative with the illuminated display such that light is transmitted through the aperture from the illuminated display, the foam pad being substantially opaque, the foam pad engaging the weight scale at a perimeter retainer that frictionally engages the weight scale in a friction-fit and further retains the foam pad to secure the foam pad in place over the weight scale.

12. The combination weight scale and bath mat of claim 8 wherein the flexible top cover and the high-friction web are sewn together at a peripheral edge of both the flexible top cover and the high-friction web, capturing the foam pad therebetween.

13. The combination weight scale and bath mat of claim 3 wherein the foam pad is made from a resilient memory-foam type material.

14. A combination weight scale and bath mat for use by a person on a support surface, comprising:
   a weight scale having a base with a top side, a bottom side, a front edge, a rear edge, a left edge, and a right edge, the four edges defining a rectangular area of the top surface of the base, and three or more feet fixed with the bottom side and adapted to hold the base above the support surface, the weight scale further including a circuit having a power source, a strain gauge mechanism, and an illuminated display on the top side of the base;
   a flexible top cover adapted for engaging the top side of the base and the at least one peripheral edge of the base, the top cover including an absorbent web of material through which the illuminated display is at least partially visible;
   the flexible top cover further including a foam pad fixed below the absorbent web, the foam pad including apertures cooperating with the illuminated display such that light is transmitted through the aperture from the illuminated display through the absorbent web, the foam pad being substantially opaque;
   the flexible top cover further including a high-friction web fixed below the absorbent web and the foam pad, the high-friction web being non-opaque and adapted to hold the flexible top cover in place on the weight scale;
   the flexible top cover further including an elastic strip proximate a peripheral edge thereof, the flexible top cover and the high-friction web being sewn together at the peripheral edge of the flexible top cover and a peripheral edge of the high-friction web, capturing the foam pad therebetween, whereby with the flexible top cover fitted over the top surface and the at least one peripheral edge of the base, the elastic strip pulls the top cover around the four edges of the base to hold the flexible top cover to the weight scale;
   whereby the person standing on the top cover activates the circuit in the weight scale, the strain gauge mechanism adapted to measure the weight of the person and the circuit displaying the numerical weight of the person through the flexible top cover, and upon stepping off of the top cover the circuit detecting the absence of the person and deactivating the illuminated display after a preset time.

* * * * *